(12) United States Patent
Chen

(10) Patent No.: US 6,908,101 B2
(45) Date of Patent: Jun. 21, 2005

(54) SAFETY LOCK FOR STROLLER

(75) Inventor: Shun-Min Chen, Taipei Hsien (TW)

(73) Assignee: Kenny Cheng (TW)

(*) Notice: Subject to any disclaimer, the term of this patent is extended or adjusted under 35 U.S.C. 154(b) by 31 days.

(21) Appl. No.: 10/457,227

(22) Filed: Jun. 9, 2003

(65) Prior Publication Data

US 2004/0046364 A1 Mar. 11, 2004

(30) Foreign Application Priority Data

Sep. 10, 2002 (CN) .................................. 02254281 U

(51) Int. Cl.⁷ .............................................. B62B 1/00
(52) U.S. Cl. ........................................................ 280/642
(58) Field of Search ........................ 280/87.041, 87.042, 280/87.05, 642, 647, 643, 648, 649, 650, 657, 658, 47.38, 47.4, 62; 403/85, 87, 113, 116; 16/357

(56) References Cited

U.S. PATENT DOCUMENTS

| | | | | |
|---|---|---|---|---|
| 4,765,645 A | * | 8/1988 | Shamie | 280/644 |
| 5,427,402 A | * | 6/1995 | Huang | 280/642 |
| 5,823,564 A | | 10/1998 | Kettler | |
| 6,062,587 A | * | 5/2000 | Cabagnero | 280/642 |
| 6,234,501 B1 | * | 5/2001 | Chen | 280/87.041 |
| 6,390,483 B1 | * | 5/2002 | Hsu et al. | 280/87.041 |
| 2001/0009322 A1 | * | 7/2001 | Tsai | 280/87.041 |
| 2001/0013688 A1 | * | 8/2001 | Warner et al. | 280/47.38 |
| 2002/0005620 A1 | * | 1/2002 | Han | 280/87.041 |
| 2002/0145264 A1 | * | 10/2002 | Hung | 280/87.041 |
| 2003/0168833 A1 | * | 9/2003 | Chen | 280/642 |
| 2003/0209882 A1 | * | 11/2003 | Yeh | 280/642 |

FOREIGN PATENT DOCUMENTS

| | | |
|---|---|---|
| GB | 982619 A | 2/1965 |
| GB | 2 178 378 A | 2/1987 |

\* cited by examiner

Primary Examiner—Bryan Fischmann
(74) Attorney, Agent, or Firm—Gauthier & Connors LLP

(57) ABSTRACT

A safety lock for a stroller including a lock body secured on a first member of the stroller and having a slot perpendicularly curved at a critical point and a sleeve member movably sliding along a second member of the stroller. The lock body has a slot for receiving a projection extending out of the sleeve member and permits the projection sliding along the slot. The slot has a substantially perpendicular angle section at one side so as to fix the relative position between the first member and the second member.

4 Claims, 6 Drawing Sheets

SAFETY LOCK FOR STROLLER

FIELD OF THE INVENTION

The present invention relates generally to a secondary safety lock for a stroller, and more particularly to a complementary safety device for preventing the stroller from being carelessly collapsed.

BACKGROUND OF THE INVENTION (1) Based on the needs of the user, the design of the stroller is generally focused on the following:

The structure is light weight and thus the stroller is easy to operate. Particularly, women, for example mothers, usually desire the stroller to be as light as possible.

(2) convenience of operation: While operating the stroller, it is often necessary to perform various adjustments such as stretching, folding, adjusting the inclination of the backrest, and carrying out other functions. Simple and easy operations allow the user to accomplish the adjustments to the desired state during short time. Usually, adults must hold the baby in their arm and adjust the stroller simultaneously in many situations. Therefore, it becomes a favorite of user that the stroller with easy and labor-saving operation.

(3) consideration of cost: For most of the users, in spite of high quality products usually obtaining high assessment, the price, however, is always an important factor of buying the stroller. Especially, most of the users of the strollers are young couples who have the heavily economic load so that the structure and material with low cost also become an important factor of designing the stroller.

(4) complete safety protection: Although all of the aforementioned points are the main factors which the consumers will take into consideration while selecting and making purchase, however, the final and the most important factor of design is the ability of protection from the potential dangers. The stroller is used to carry the baby from 0 to 3.5 years old. It is important that the stroller remain stable, can be properly operated and protects the baby during use. This important factor is not only paid much attention to by the consumers, but also endeavored to by the producers so as to avoid all potential safety problems. The authorities concerned of the merchandise safety in all countries have definite requirements in the respect of this factor.

It is apparent that all kinds of strollers are developed through the processes of design taken the above-mentioned factors into consideration. However, in fact, it is difficult to reach the best conditions in all above aspects in one product. For example, the simple and convenient structure of collapsing perhaps has many problems in safety; the multifunction stroller is typically heavy; the light material stroller is easy to operate perhaps but has high manufacturing cost and design. Accordingly, what the producer can pursue to is only to adjust the direction of design according to the particular needs of a certain group of consumers and endeavors to achieve a reasonable balance which can be accepted by the consumers.

The operation of collapsing and stretching the stroller can be accomplished by only one hand. However, in some situations, due to easily being collapsed, there exists a potential risk. Especially, when the infant is still in the stroller, it happens that the stroller is carelessly collapsed. Once this accident happens, the infant maybe be squeezed by the structure of the stroller, or drop out of the stroller, or moreover have the risk of life.

Consequently, it is necessary to design a safety protection structure that can effectively upgrade the safety of the stroller under the condition of not affecting the above factors of design.

SUMMARY OF THE INVENTION

Accordingly, the present invention relates to a safety lock for a stroller that can substantially obviate one or more of the problems due to the limitations and disadvantages of the related arts.

One object of the present invention is the provision of a safety lock for a stroller which can prevent the stroller from being accidentally collapsed.

Another object of the present invention is the provision of a safety lock for a stroller which can achieve the effect of safety protection under the operation mode of not affecting other part.

A further object of the present invention is to provide a safety lock for a stroller which can reach the goal of safety but does not incur any inconvenience of operation.

And yet another object of the present invention is to provide a safety lock for a stroller which takes safety, convenience, cost and light weight into consideration at same time.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a safety lock for a stroller comprises a lock body secured on a first member of the stroller, having a slot curved at a critical point; a sleeve member movably bushed around a second member of the stroller, having a projection. When the projection slides in the slot and when the projection is at one side of the critical point, the stroller is in a state of being stretched. On the other hand, when the projection is at the other side of the critical point, the stroller is in a state of being collapsed.

It is preferred that the sleeve member further comprises a lobe protruding out of a surface of the sleeve member.

Preferably, the slot further comprises an angle section at one side of the critical point.

Alternatively, the slot further comprises an inclined section at the other side of the critical point.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 1:
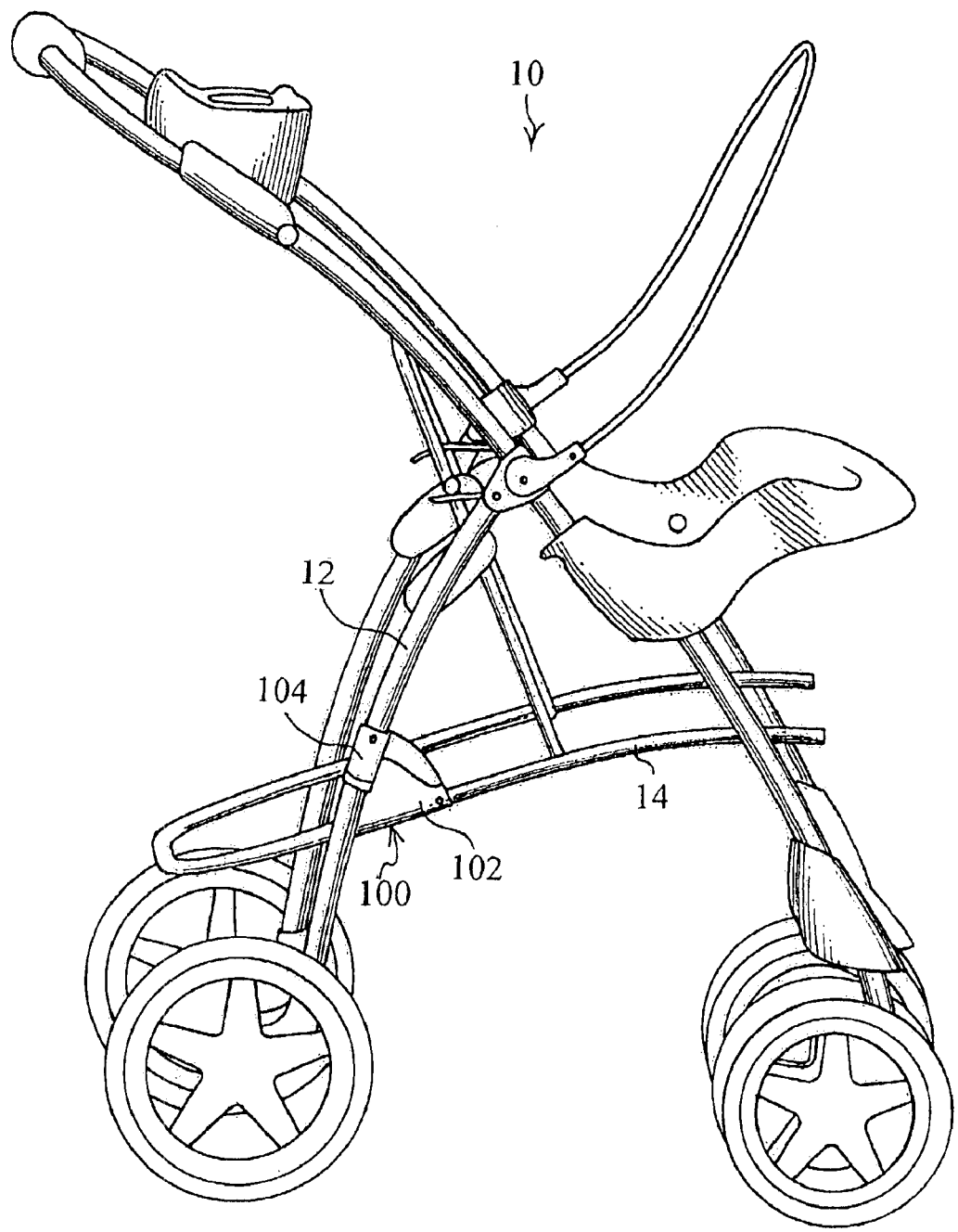
FIG. 1 is an assembled schematic view illustrating the safety lock is installed at a foldable stroller in a state of being stretched according to the present invention.

A stroller 10 shown in FIG. 1 is a common collapsible stroller whose safety lock 100 is respectively fixed at a first member 14 and a second member 12 of the stroller 10. The safety lock 100 includes a lock body 102 secured at the first member 14 and a sleeve member 104 movably bushed around the second member 12.

Figure 2:
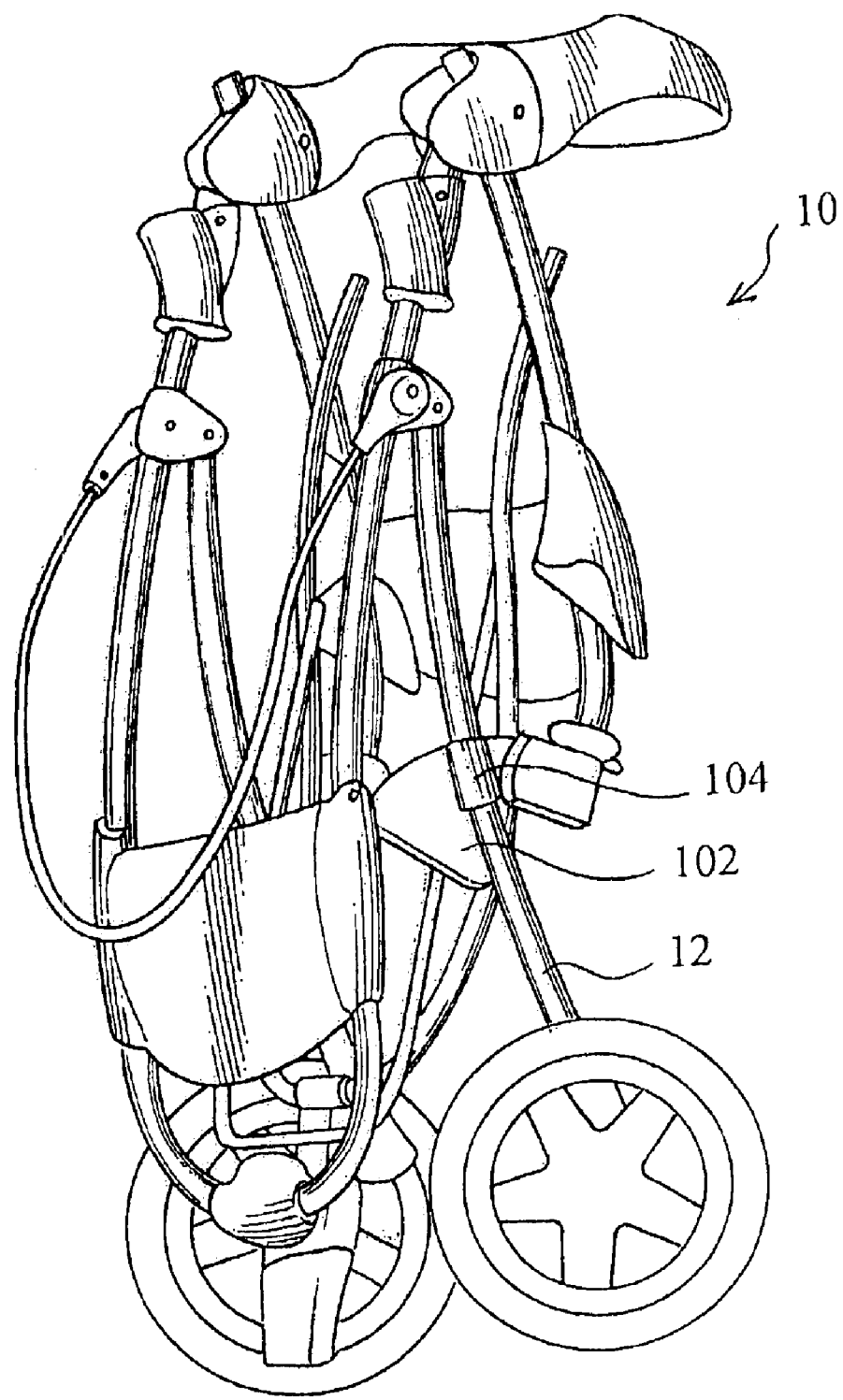
FIG. 2 is an assembled schematic view of the safety lock of the stroller according to the present invention illustrating the safety lock in a state of being folded.

As shown in FIG. 1 and FIG. 2, the relative position between the sleeve member 104 and the lock body 102 is obviously different in response to the change of the stretched state and the collapsed state of the stroller 10. The details will be referred to the drawings and illustrated in the following.

Figure 3:
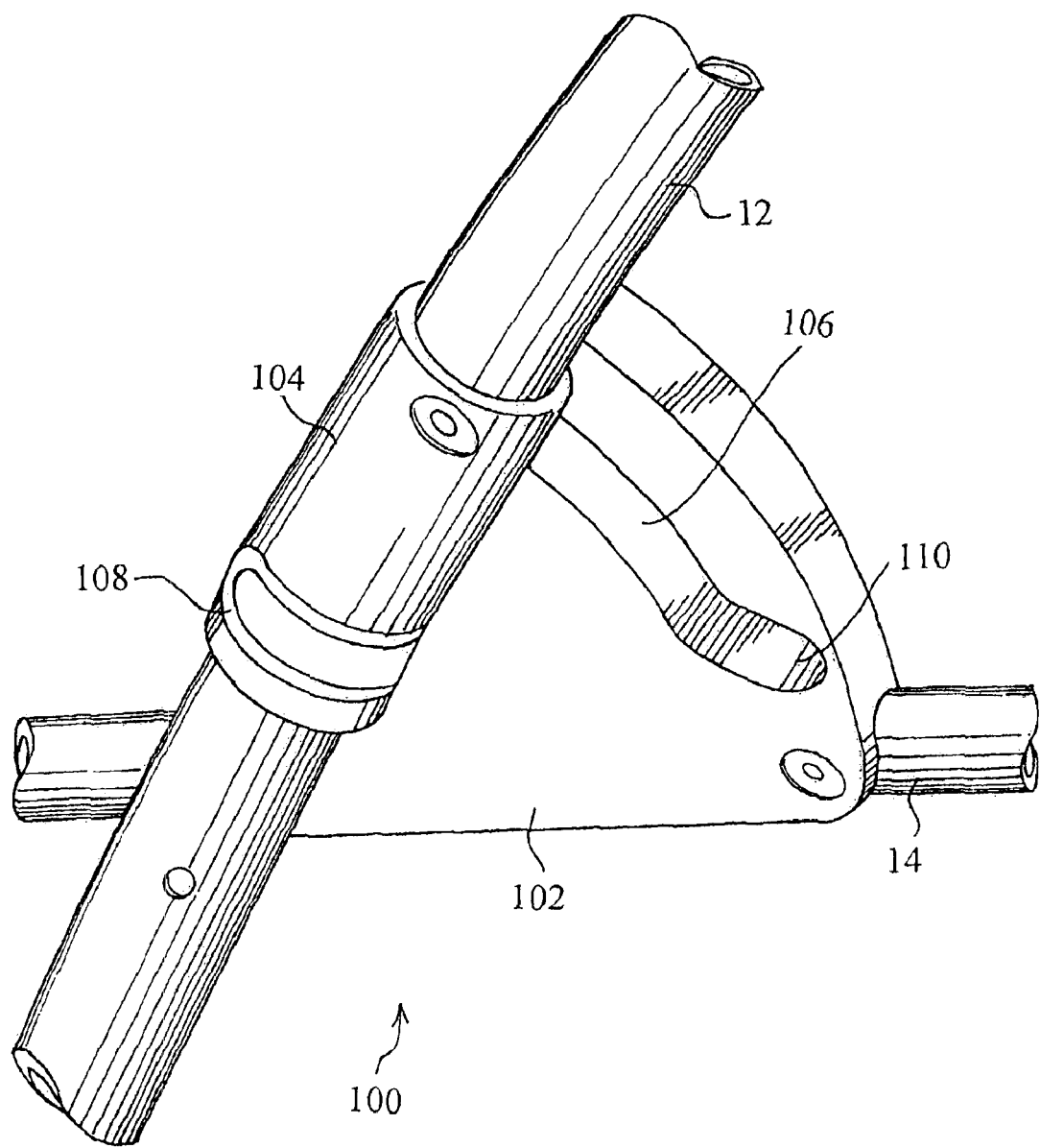
FIG. 3 is a partially enlarged perspective view of the safety lock according to the present invention illustrating the safety lock in a state of being stretched.
Figure 4:
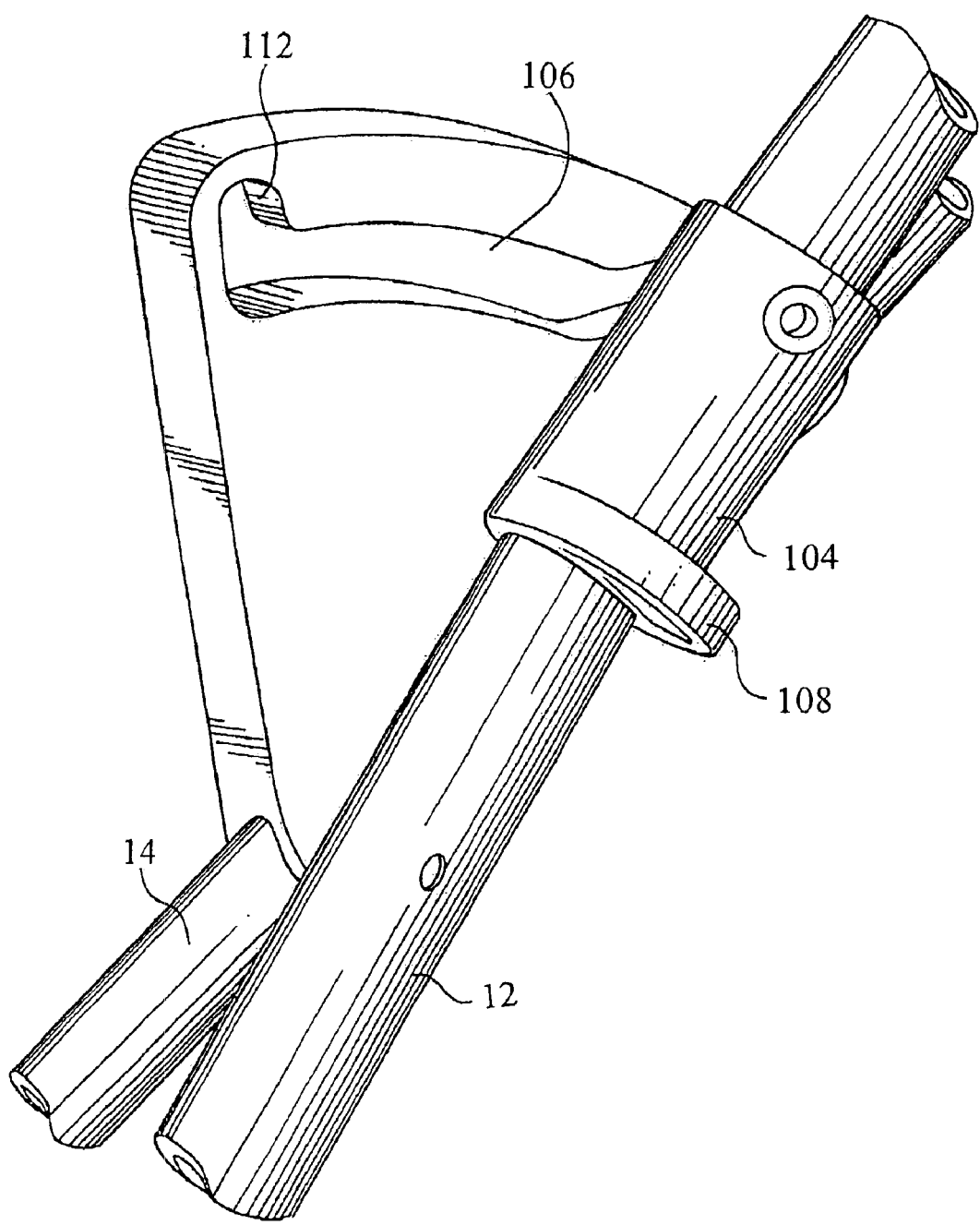
FIG. 4 is a partially enlarged perspective view of the safety lock according to the present invention illustrating the safety lock in a state of being folded.

As shown in FIG. 3 and FIG. 4, a projection 114 (shown in FIG. 6, not shown in FIG. 3 and FIG. 4) equipped at the sleeve member 104 slides along a slot 106 provided in the lock body 102 and opened at a surface of the lock body 102. The slot 106 extends substantially like an arc, but respectively has an angle section 112 perpendicular to the arc and an inclined section 110 at both ends. As shown in FIG. 3, when the stroller 10 is in a state of being stretched, the projection 114 is engaged at the top end of the angle section 112. As shown in FIG. 4, when the stroller 10 is in a state of being completely folded, the projection 114 is engaged at one end of the inclined section 110. In other word, during the process of the stroller 10 switching from the state of being stretched to the state of being folded, the projection 114 slides from the top end of the angle section 112 to one end of the inclined section 110.

Figure 5:
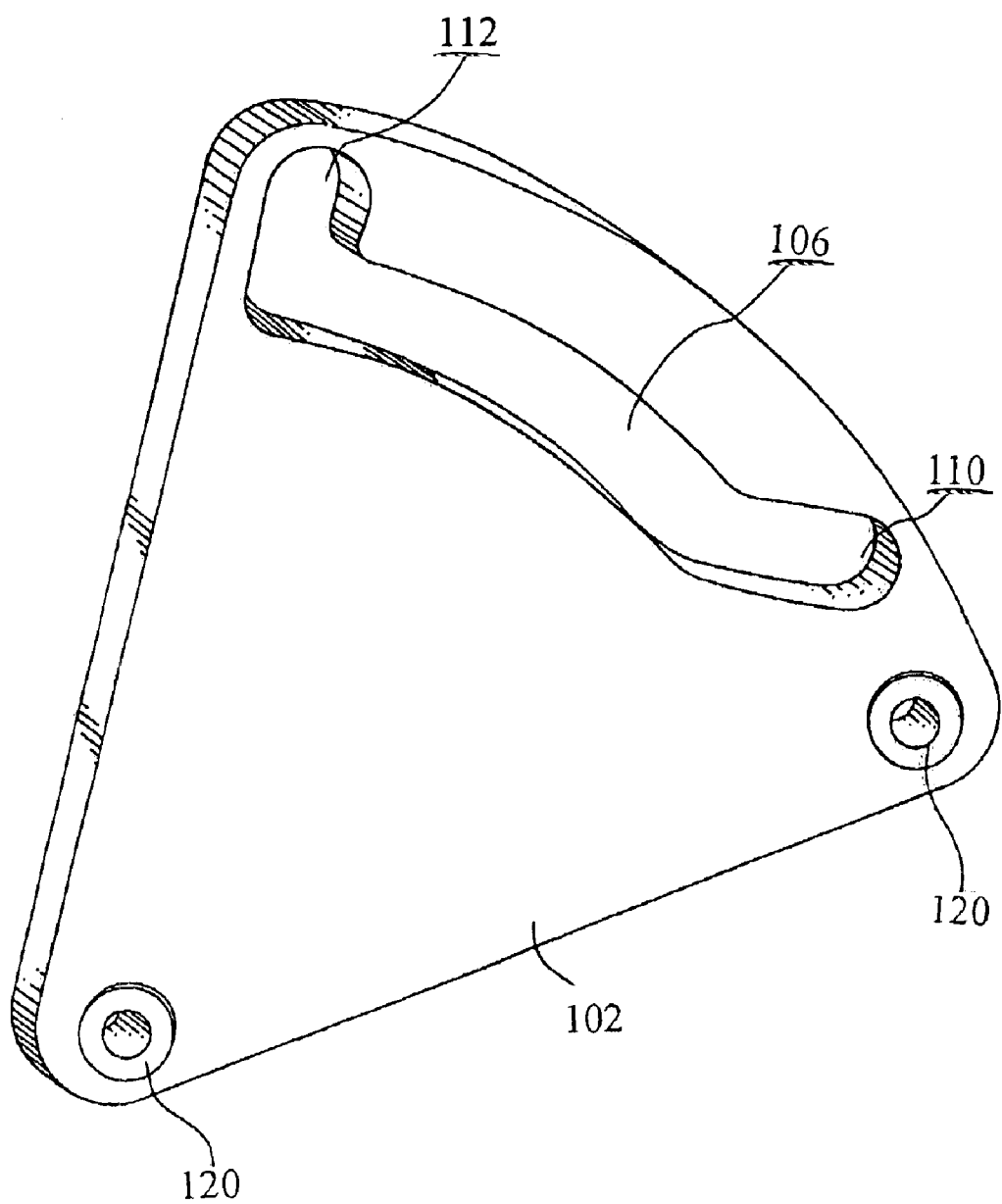
FIG. 5 is a partially enlarged perspective view of the safety lock according to the present invention illustrating the lock body.

As shown in FIG. 5, the lock body 102 is provided with a slot 106 which includes an angle section 112 and an inclined section 110. The width and the depth of the slot 106 are designed corresponding to the diameter and the length of the projection 114 so as to permit the projection 114 to smoothly slide along the whole range of the slot 106.

The holes 120 are provided for the rivets or the screws to penetrate and to secure the lock body 102 at the first member 14 of the stroller 10. For the stability of the entire structure, the number of the rivets or the screws is preferably two and also can be adequately increased.

Figure 6:
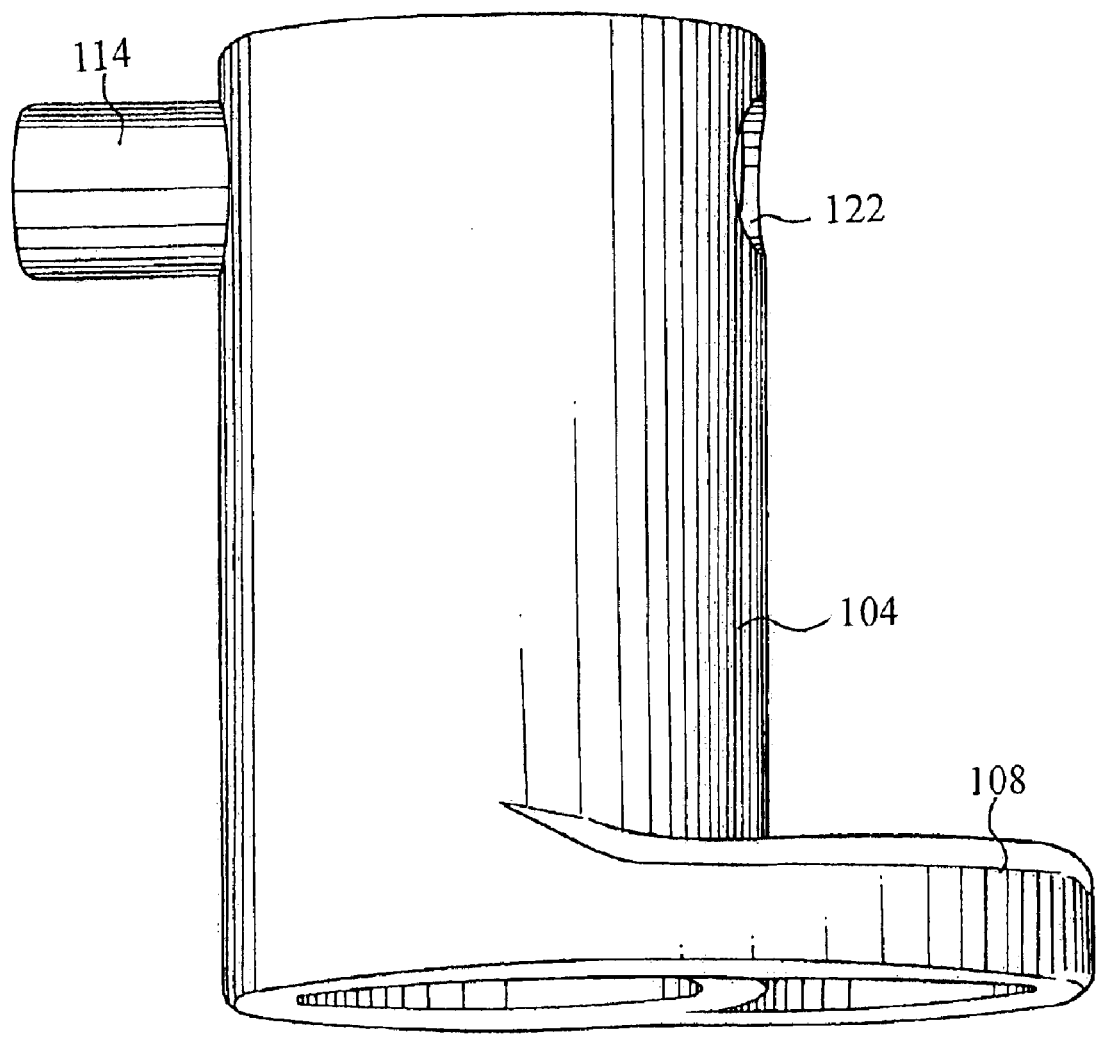
FIG. 6 is a partially enlarged perspective view of the safety lock according to the present invention illustrating the sleeve member.

As shown in FIG. 6, the sleeve member 104 is provided with a lobe 108, a projection 114 and an aperture 122. By means of a connecting means such as a fastener penetrating the aperture 122, the sleeve member 104 is movably fixed at a proper position of the second member 12 of the stroller 10, which is near the crossing of the second member 12 and the first member 14. As mentioned above, in the state of the stroller 10 being stretched, when the user presses the lobe 108 and pushes the sleeve member 104 downward, the projection 114 at first slides from the top end of the angle section 112 to the critical point, the crossing of the angle section 112 and the arc of the slot 106. At this time, synchronizing with the collapsing action, the projection 114 slides along the longitudinal direction of the slot 106 to the inclined section 110, then slides into the inclined section 110, and finally reaches the end of the inclined section 110 when the operation of collapsing the stroller 10 is accomplished. It can be understood through the above operation processes that the collapsing actions provide the projection 114 with a clockwise force.

Therefore, in the condition that the sleeve member 104 is not pushed downward, even if it is desired to collapse the stroller, however, the projection 114 will be restricted in the extending direction of the angle section 112 and cannot slide along the arc of the slot 106. Consequently, the stroller cannot be collapsed whereby the safety lock 100 can reach the object of complete protection.

On the contrary, when the stroller is operated from the state of being collapsed to the state of being stretched, the projection 114 slides from the end of the inclined section 110 and along the longitudinal direction of the slot 106. When the projection 114 reaches the critical point, e.g. the crossing of the angle section 112 and the arc of the slot 106, the projection 114 is exerted a restoration force resulting from the sleeve member 104 and then slides into the end of the angle section 112 to finish the locking actions.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A safety lock for a stroller, comprising:

a lock body secured on a first member of the stroller, having a curved slot;

a sleeve member slidably received around a second member of the stroller, having a projection;

wherein the projection slides along the slot and when the projection is at one side of the slot, the stroller is in a state of being stretched; on the other hand, when the projection is at the other side of the slot, the stroller is in a state of being collapsed.

2. The safety lock for the stroller as claimed in claim 1, wherein the sleeve member further comprises a lobe protruding out of a surface of the sleeve member.

3. The safety lock for the stroller as claimed in claim 1, wherein the slot further comprises an angle section at one side of the slot.

4. The safety lock for the stroller as claimed in claim 1, wherein the slot further comprises an inclined section at the other side of the slot.

* * * * *

UNITED STATES PATENT AND TRADEMARK OFFICE
CERTIFICATE OF CORRECTION

PATENT NO. : 6,908,101 B2
DATED : August 23, 2005
INVENTOR(S) : Cheng et al.

It is certified that error appears in the above-identified patent and that said Letters Patent is hereby corrected as shown below:

<u>Title page,</u>
Item [30], Foreign Application Priority Data, please change the filing number to the following:
-- 02254281.7 --.

Signed and Sealed this

Eleventh Day of October, 2005

JON W. DUDAS
*Director of the United States Patent and Trademark Office*